April 24, 1951     T. N. BUSCH     2,550,185
SELF-LOADING VEHICLE

Filed Jan. 2, 1948     3 Sheets-Sheet 3

Inventor,
Tom N. Busch,
By Albert E Dietrich,
Attorney.

Patented Apr. 24, 1951

2,550,185

UNITED STATES PATENT OFFICE 2,550,185

SELF-LOADING VEHICLE

Tom N. Busch, Georgetown, S. C.

Application January 2, 1948, Serial No. 133

6 Claims. (Cl. 214—65)

My invention relates to machines for loading and unloading bundles of pulpwood and it particularly has for its objects:

1. To provide a trailer with a high boom gooseneck A-frame mounted on the base frame of the trailer, which frame is swung back and forth by means of a double acting hydraulic ram.
2. To provide means to load bundles of pulpwood and similar merchandise on a small trailer in the woods and convey the load to a highway or other transporting vehicle which is capable of carrying a considerable load to a destination where the load is to be used or further transshipped.
3. To provide a high boom gooseneck A-frame type arch mounted on either "Athey" type steel truss crawler wheel substitute, on rubber tired wheels, or on skis or sleds for the far North operations and actuate the boom forward and backward by a double acting ram to enable the boom to load its own base or platform with ties, pulpwood, veneer bolts, etc., for the purpose of hauling the same out of the woods from places inaccessible to trucks and thence load the trucks or other vehicles at a more convenient place.
4. To provide equipment for the above purposes as well as for skidding logs and loading logs on truck trailers.
5. To provide a rig that will take a load itself, haul the load out of a place inaccessible to larger vehicles and then transfer its load to another conveyance.

Other objects will in part be obvious and in part be pointed out hereinafter.

To the attainment of the aforesaid objects and ends invention still further resides in the novel details of construction, combination and arrangement of parts, all of which will be first fully described in the following detailed description, and then be particularly pointed out in the appended claims, reference being had to the accompanying drawing, in which:

Fig. 5 is a detail section on the line 5—5 of Fig. 1.

Figure 1:
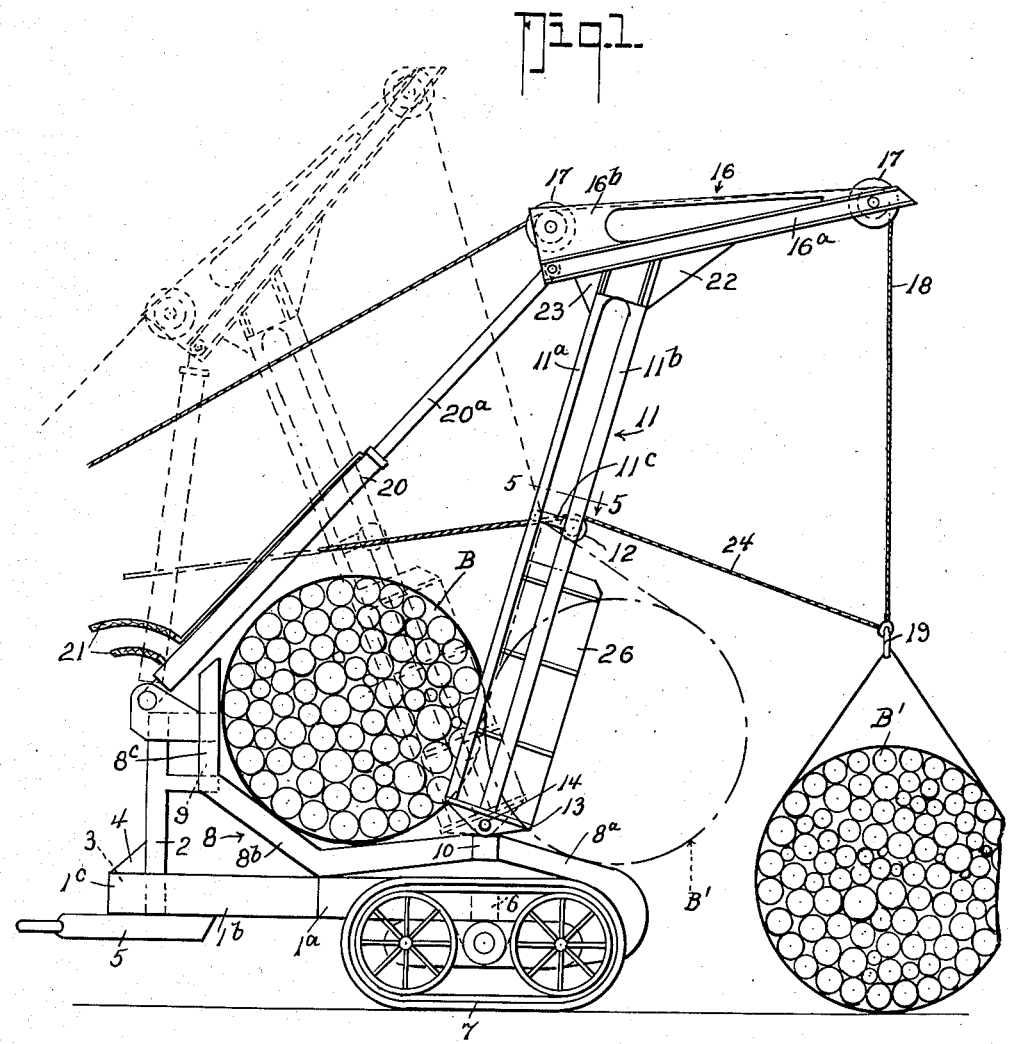
Fig. 1 is a side elevation illustrating my invention in use.
Figure 2:
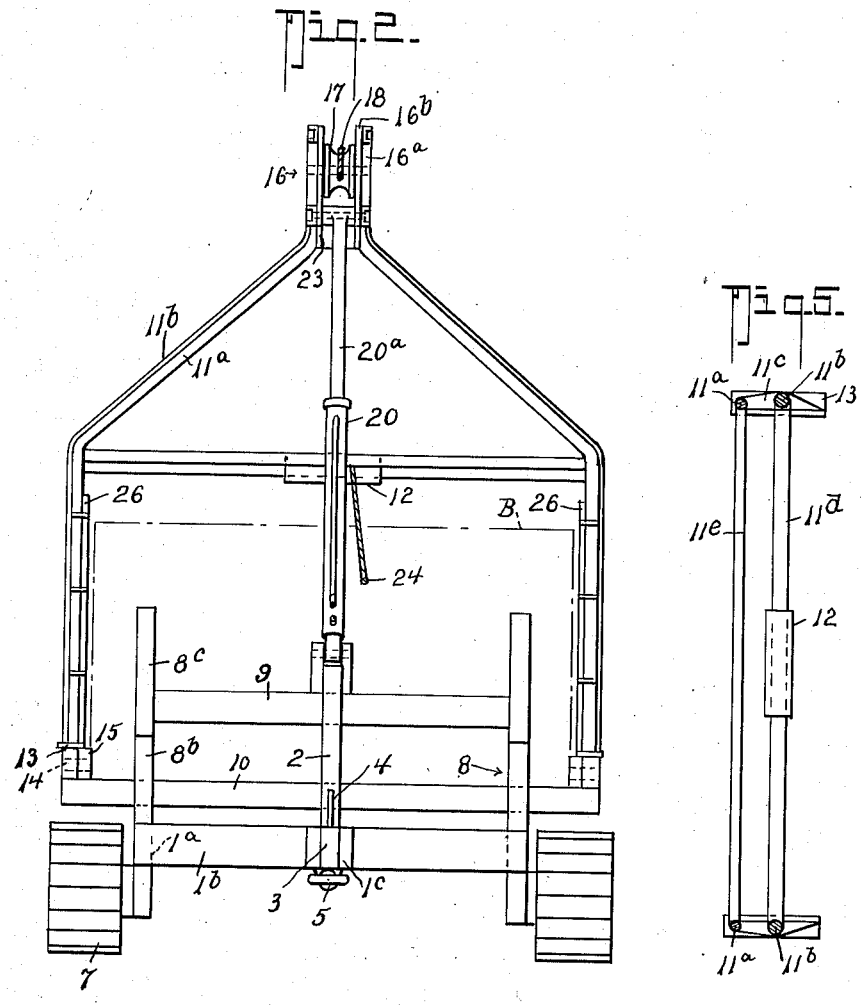
Fig. 2 is an end view of the same.
Figure 3:
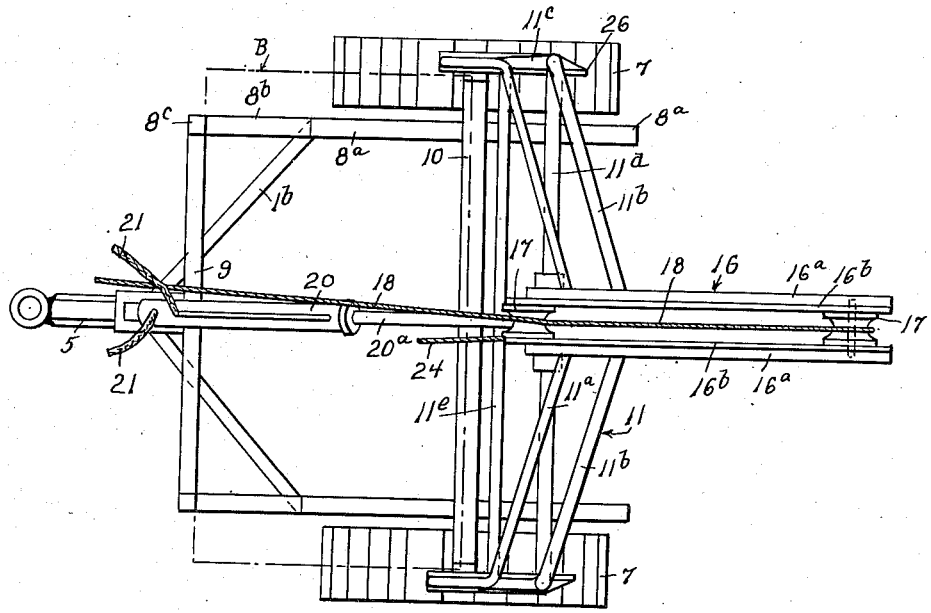
Fig. 3 is a top plan view of the same.
Figure 4:
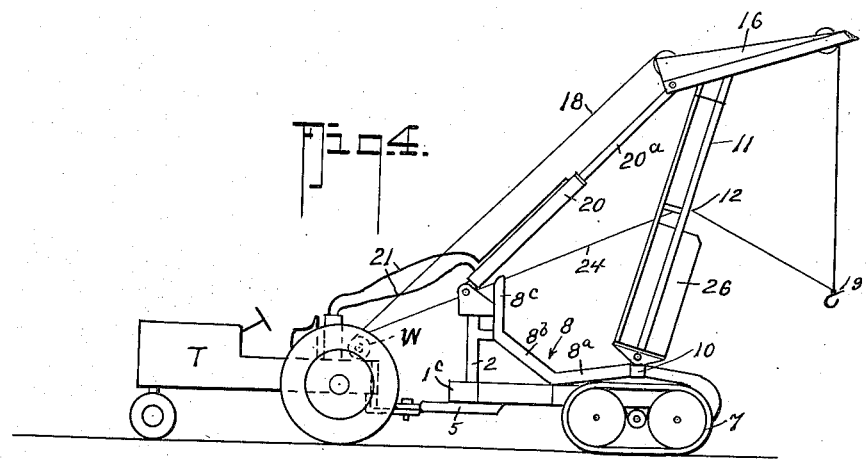
Fig. 4 is a schematic view of the apparatus.

In the drawings in which like numerals and letters of reference indicate like parts in all the figures, 1 represents a base frame composed of side beams 1a widely spaced apart at the rear and tapering toward each other at the front, as at 1b, with their ends 1c secured to an upright post 2 and block 3 braced as at 4. A draft bar 5 is mounted to and below the frame at its forward end. The base frame 1 includes a cross bar 6 and is mounted on suitable road traversing elements 7 which may be ordinary truck wheels, or wheel substitutes, such as crawlers, skis, or sleds, etc.

Suitably mounted on the base frame 1 are a pair of laterally spaced apart longitudinal bars 8 each of which includes a bridge like portion 8a, an upwardly-forwardly inclined portion 8b and a vertical part 8c, the latter parts being connected together by a cross bar 9 to which the upright 2 is also secured.

The bridge portion 8a of each bar 8 is connected by a cross beam 10 on the ends of which a high boom gooseneck A-frame 11 is mounted. The boom comprises parallel side bars 11a, 11b connected about midway their ends by bars 11c, the bars 11a, 11b at one side being connected to those at the other side by cross connecting bars 11d, 11e, one of which 11d carries a roller 12. The lower ends of each pair of bars 11a, 11b are secured to a rocker 13 which is pivoted at 14 to a bracket 15 on the beam 10. The portions of the bars 11a, 11b below the cross bars 11c, 11d, 11e are parallel and constitute the legs of the A-frame 11. Above said bars 11c, 11d, 11e the bars 11a, 11b at one side converge with the bars 11a, 11b at the other side and have their upper ends rigidly secured to the boom arm 16.

The boom arm 16 comprises parallel spaced apart beams 16a to which plates 16b are secured and between which plates and beams sheaves 17 are journalled, one at the front of the arm and one at the rear of the same, over which sheaves, a load lifting cable 18 having a hook 19 passes. The cable 18 is operated in any suitable way by a winch on the usual towing tractor T.

Pivotally mounted on the upper end of the post 2 is a double acting hydraulic ram 20 whose piston 20a is pivoted to the rear ends of the arm between the beams 16a and is operated from the towing vehicle via hydraulic lines 21 in known ways to rock the A-frame boom on its pivot.

The arm 16 extends from the A-frame forwardly-upwardly at an angle of about 120° and is suitably braced as at 22, 23.

24 designates a guide cable that passes over roller 12 and is fastened to hook 19. The cable 24 also serves to hold a second bundle B' of ties or logs, etc. on the downwardly rearwardly inclined portion of the bridge 8a, while a first bundle B rests in the crotch formed by the portion 8b—8a as shown in Fig. 1.

Welded, or otherwise suitably secured, to the side bars of the legs are wing plates 26 which serve as end stops for the loads B and B'.

In operation the load is lifted and pulled on the base or platform of the loader by the cables 18 and 24 respectively, operated from a standard single drum towing winch mounted on the rear of the towing vehicle. The load is then hauled out of the woods to a long-distance haul truck or trailer and the load transferred to such conveyance in a few minutes with the same equipment.

After the loads B and B' have been brought into place across the bars 8, cable 24 may be tied or anchored to a suitable part of the frame, while the boom is in the dotted line position shown in Fig. 1, as may also be the cable 18, if desired.

From the foregoing description, taken in connection with the accompanying drawings, it is thought that the construction, operation and advantages of the invention will readily appear to those skilled in the art.

What I claim is:

1. In apparatus of the class described, a base having a base frame including parallel longitudinal side beams, and a cross beam connecting the same adjacent one end of said frame and a draft connection at the other end of the same, road traversing elements supporting said base beam, two side bars, one mounted at either side of said base frame and each including a bridge-like portion located over said road traversing elements and including upwardly directed load stops located between said bridge-like portions and the draft end of said base frame, a cross beam connecting said bridge-like portions, an A-frame pivoted to said last named cross beam adjacent its ends, an arm carried by the upper end of said A-frame and having rope guides, a load lifting cable taking over said guides, and a double acting hydraulic ram mounted on said base and operatively connected with said A-frame for swinging it back and forth on the pivotal axis of the A-frame.

2. In apparatus of the class described, a base having a base frame including parallel longitudinal side beams, and a cross beam connecting the same adjacent one end of said frame and a draft connection at the other end of the same, road traversing elements supporting said base beam, two side bars, one mounted at either side of said base frame and each including a bridge-like portion located over said road traversing elements and including upwardly directed load stops located between said bridge-like portions and the draft end of said base frame, a cross beam connecting said bridge-like portions, an A-frame pivoted to said last named cross beam adjacent its ends, an arm carried by the upper end of said A-frame and having rope guides, a load lifting cable taking over said guides, and means for moving said A-frame back and forth on its pivotal axis.

3. In apparatus of the class described, a horizontally disposed base frame, pairs of spaced traction wheels mounted under and at each side of said frame adjacent the rear of the same, longitudinally disposed bars, one located adjacent each side of said base frame and extending above the same, said bars each including a bridge-like portion having a downwardly forwardly inclined part and a downwardly rearwardly inclined part, said bars also including a forwardly upwardly extending part, a load stop at the forward end of said last named extending part, a cross beam joining said bridge-like portions at the top of the same, an A-frame pivoted at its lower extremity to said cross beam on a transverse axis, a rearwardly extending arm on the top of said A-frame, cable guides on said rearwardly extending arm, a load hoisting and lowering cable passing over said cable guides and carrying a load engaging member, a two-way operating hydraulic jack carried by said base frame and operatively connected with said A-frame for swinging it back and forth on its pivotal axis, by virtue of all of which a bundle of logs can be loaded on the forward part of the bridge-like members and a second bundle of logs can be loaded on the rearward part of the bridge-like members and held in place by said cable when the A-frame has been swung forward.

4. In apparatus of the class described, a horizontally disposed base frame, pairs of spaced traction wheels mounted under and at each side of said frame adjacent the rear of the same, longitudinally disposed bars, one located adjacent each side of said base frame and extending above the same, said bars each including a bridge-like portion having a downwardly forwardly inclined part and a downwardly rearwardly inclined part, said bars also including a forwardly upwardly extending part, a load stop at the forward end of said last named extending part, a cross beam joining said bridge-like portions at the top of the same, an A-frame pivoted at its lower extremity to said cross beam on a transverse axis, a rearwardly extending arm on the top of said A-frame, cable guides on said rearwardly extending arm, a load hoisting and lowering cable passing over said cable guides and carrying a load engaging member, a two-way operating hydraulic jack carried by said base frame and operatively connected with said A-frame for swinging it back and forth on its pivotal axis, side plates on said A-frame adjacent its lower end to hold the loaded material against movement transversely of the frame, by virtue of all of which a bundle of logs can be loaded on the forward part of the bridge-like members and a second bundle of logs can be loaded on the rearward part of the bridge-like members and held in place by said cable when the A-frame has been swung forward.

5. In apparatus of the class described, a horizontally disposed base frame, pairs of spaced traction wheels mounted under and at each side of said frame adjacent the rear of the same, longitudinally disposed bars, one located adjacent each side of said base frame and extending above the same, said bars each including a bridge-like portion having a downwardly forwardly inclined part and a downwardly rearwardly inclined part, said bars also including a forwardly upwardly extending part, a load stop at the forward end of said last named extending part, a cross beam joining said bridge-like portions at the top of the same, an A-frame pivoted at its lower extremity to said cross beam on a transverse axis, a rearwardly extending arm on the top of said A-frame, cable guides on said rearwardly extending arm and on said A-frame, a load hoisting and lowering cable passed over the cable guides on said rearwardly extending arm and carrying a load engaging member, a guide cable passing over the cable guide on said A-frame and connected to said load engaging member, a two-way operating hydraulic jack mounted on said base frame and operatively connected with said A-frame for swinging it back and forth on its pivotal axis, by virtue of all of which a bundle of logs can be loaded on the forward part of said bridge-like portions and a second bundle of logs can be loaded on the rearward part of said bridge-like portions and held in place by said cables when the A-frame has been swung forward.

6. In apparatus of the class described, a horizontally disposed base frame, pairs of spaced traction wheels mounted under and at each side of said frame adjacent the rear of the same, longitudinally disposed bars, one located adjacent each side of said base frame and extending above the same, said bars each including a bridge-like portion having a downwardly forwardly inclined part and a downwardly rearwardly inclined part, said bars also including a forwardly upwardly extending part, a load stop at the forward end of said last named extending part, a cross beam joining said bridge-like portions at the top of the same, an A-frame pivoted at its lower extremity to said cross beam on a transverse axis, a rearwardly extending arm on the top of said A-frame, cable guides on said rearwardly extending arm and on said A-frame, a load hoisting and lowering cable passed over the cable guides on said rearwardly extending arm and carrying a load engaging member, a guide cable passing over the cable guide on said A-frame and connected to said load engaging member, a two-way operating hydraulic jack mounted on said base frame and operatively connected with said A-frame for swinging it back and forth on its pivotal axis, by virtue of all of which a bundle of logs can be loaded on the forward part of said bridge-like portions and a second bundle of logs can be loaded on the rearward part of said bridge-like portions and held in place by said cables when the A-frame has been swung forward, and side plates on said A-frame adjacent said lower end to hold the bundles against movement transversely of said base frame.

TOM N. BUSCH.

REFERENCES CITED

The following references are of record in the file of this patent:

UNITED STATES PATENTS

| Number | Name | Date |
|---|---|---|
| 1,886,614 | Wolkow | Nov. 8, 1932 |
| 1,909,689 | Kuchar | May 16, 1933 |
| 2,058,473 | Le Tourneau | Oct. 27, 1936 |
| 2,290,738 | Chadwick, Jr. | July 21, 1942 |
| 2,294,354 | Guignard | Aug. 25, 1942 |
| 2,305,148 | Dempster | Dec. 15, 1942 |
| 2,360,654 | Day | Oct. 17, 1944 |
| 2,417,658 | Nichols | Mar. 18, 1947 |
| 2,426,889 | Le Tourneau | Sept. 2, 1947 |
| 2,433,598 | Chadwick, Jr. | Dec. 30, 1947 |